(12) United States Patent
Esposito

(10) Patent No.: US 6,480,113 B1
(45) Date of Patent: Nov. 12, 2002

(54) WATER LEVEL ALARM

(76) Inventor: David W. Esposito, 88 Millbrook Rd., Colebrook, CT (US) 06021

( * ) Notice: Subject to any disclaimer, the term of this patent is extended or adjusted under 35 U.S.C. 154(b) by 0 days.

(21) Appl. No.: 09/489,720

(22) Filed: Jan. 24, 2000

(51) Int. Cl.[7] ............................................. G08B 17/00
(52) U.S. Cl. ...................... 340/624; 340/693.5; 73/305; 73/308; 200/84 A; 200/61.2; 200/DIG. 14
(58) Field of Search ................................. 340/618, 623, 340/625, 624, 693.5; 73/305, 308; 200/84 A, 61.2, DIG. 14

(56) References Cited

U.S. PATENT DOCUMENTS

| | | | |
|---|---|---|---|
| 3,786,464 A | | 1/1974 | Staempfli .................. 340/245 |
| 3,849,771 A | * | 11/1974 | Applin ...................... 340/624 |
| 4,258,444 A | | 3/1981 | Orszullok ..................... 4/538 |
| 4,757,305 A | | 7/1988 | Peso ......................... 340/624 |
| 4,814,752 A | * | 3/1989 | Lehman ...................... 340/623 |
| 5,026,954 A | * | 6/1991 | Cebulski ..................... 340/624 |
| 5,125,247 A | * | 6/1992 | Mills ......................... 340/624 |
| D356,968 S | | 4/1995 | Flick ........................ D10/106 |
| 5,493,877 A | | 2/1996 | Wickremasinghe ......... 68/208 |
| 5,661,462 A | * | 8/1997 | Shrewsbury-Gee ......... 340/618 |
| 5,953,982 A | * | 9/1999 | Curry ........................ 340/624 |
| 6,160,482 A | * | 12/2000 | Hill ............................ 340/625 |

FOREIGN PATENT DOCUMENTS

WO        98/27520        6/1998

* cited by examiner

Primary Examiner—Daniel J. Wu

(57) ABSTRACT

An alarm system comprising a housing, a float, a battery compartment, a speaker and an alarm where the housing can be connected to the side wall of any container by a suction device fixedly engaged to the housing. The float rises with the water and creates a connection by completing a circuit when making contact with two separate conductors. The float compartment may be sealed with a threaded cap which can engage threads on the bottom of the housing.

18 Claims, 2 Drawing Sheets

WATER LEVEL ALARM

BACKGROUND OF THE INVENTION

1. Field of the Invention

The present invention relates to an apparatus for sounding a signal when water entering a container such as a tub or basin reaches a pre-determined level.

2. Description of the Prior Art

Audible alarms that sound when inflowing water reaches a pre-determined level are known in the art. U.S. Pat. No. 4,757,305 discloses a device affixed to the side wall of a bathtub by a clamping device, a float chamber, a float within the chamber, an alarm, a battery compartment and a speaker to emit a signal when the rising float causes a connection to be completed. U.S. Pat. No. 4,258,444 discloses a vertically adjustable detection device with the tub or structure wall. A need exists beyond the prior art for an inexpensive device that can be used in a wide variety of locations to sound a signal when water has reached a level selected by the user of the apparatus. A further need exists for a device that can be stored when not in use to preserve the batteries.

SUMMARY OF THE INVENTION

The present invention meets the needs and solves the problems identified above by providing an alarm system comprising a housing, a float, a battery compartment, a speaker and an alarm where the housing can be connected to the side wall of any container by a suction device fixedly engaged to the housing. The float rises with the water and creates a connection by completing a circuit when making contact with two separate conductors. The float compartment may be sealed with a threaded cap which can engage threads on the bottom of the housing.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF PREFERRED EMBODIMENTS

Figure 1:
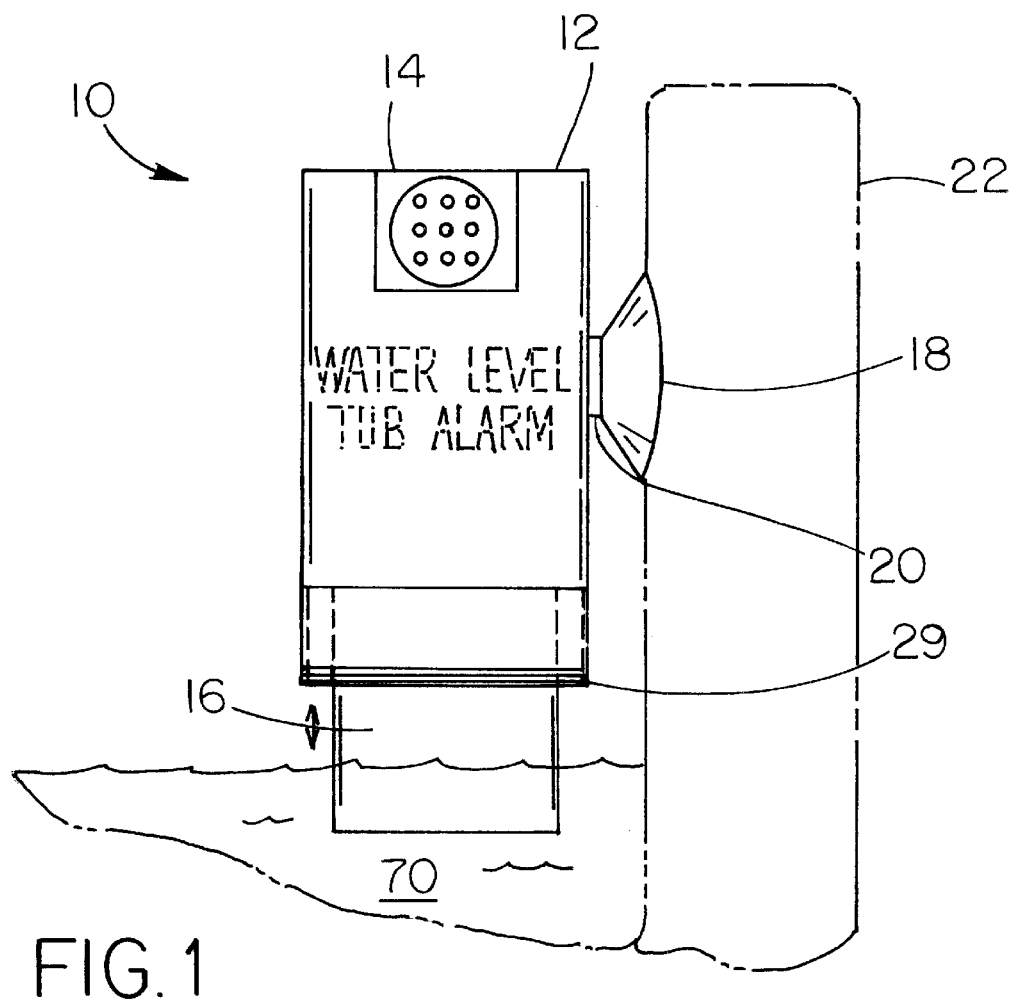
FIG. 1 is side view of the invention.

In FIG. 1, water alarm 10 is affixed to bath tub sidewall 22 by suction cup 18 fixedly engaged to suction cup arm 20 fixedly engaged to housing 12 of water alarm 10. Speaker aperture 14 is removably affixed to housing 12 and provides openings for the alarm signal to emit from water alarm 10. Float 16 is shown partially immersed in water 70.

Figure 2:
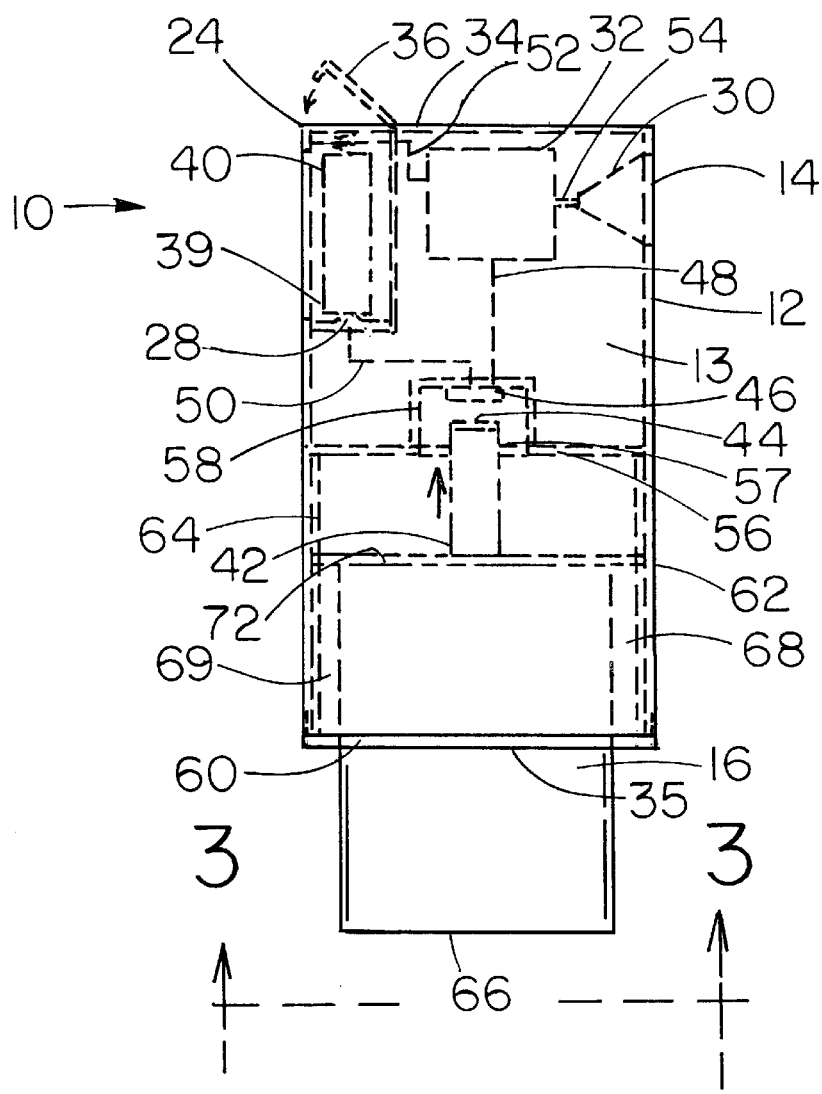
FIG. 2 is an interior view of the components within the housing of the invention.

FIG. 2 shows the interior of water alarm 10. Float 16 has first arm 68 and second arm 70 which are slidingly engaged with first groove 62 and second groove 64. Float 16 is fixedly engaged to contact arm 42. Lip 60 on housing 12 keeps float 16 from sliding out of housing 12. Float 16 has float top 72 and float bottom 66. Float top 72 extends outward beyond the cylinder of float 16 to slidingly engage the interior sides of housing 12. Rising water (not shown) will cause float 16 to rise which in turn will cause contact arm 42 to rise through hole 57 in floor 56 of alarm compartment 13. Contact arm 42 has first contact 44 and as contact arm 42 rises, first contact 44 will meet second contact 46 in contact compartment 58. Second contact 46 is connected to second alarm wire 48 and power supply wire 50. Second contact 46 is configured so that current will flow from power supply wire 50 to second alarm wire 48 when first contact 44 engages second contact 46. Battery 40 is positioned within battery compartment 38 by raising lid 36 and placing battery 40 inside battery compartment 38. When lid 36 is closed, battery 40 is electrically and physically engaged to third contact 24 and to fourth contact 28. Third contact 24 is connected to first alarm wire 52. Third contact 24 is shown within housing 12. However, third contact 24 may be positioned on lid 36 such that when lid 36 is closed, third contact 24 physically and electrically engages battery 40. Fourth contact 28 is connected to power supply wire 50. When first contact 44 engages second contact 46, alarm 32 will be energized and cause speaker 30 to emit audible sound through speaker aperture 14. Alarm 32 is connected to second contact 46 by second alarm wire 48. Alarm 32 is connected to speaker 30 by speaker connection 54. In the preferred embodiment, housing 12 is made from plastic or other suitable material for waterproof construction. Housing 12 has housing first end 34 and housing second end 35. Housing second end 35 may be threaded 29 for rotatably engagement with cap 26 (shown in FIG. 4).

Figure 3:
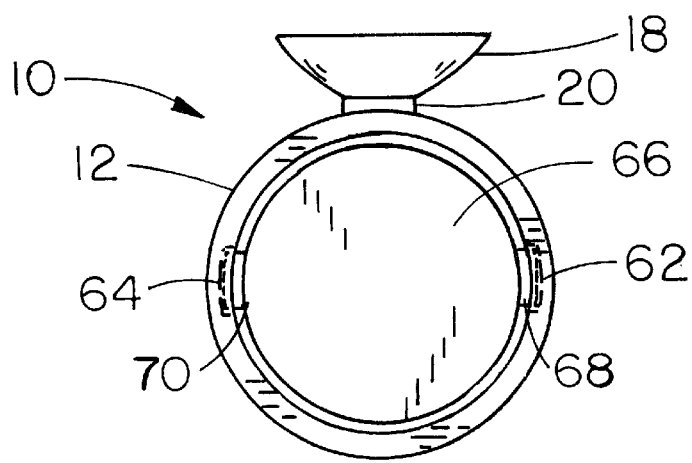
FIG. 3 is a bottom view of the invention.

FIG. 3 is a bottom view of water alarm 10. Float bottom 66 is seen with first arm 68 and second arm 69 within first groove 62 and second groove 64 respectively. Suction cup 18 is affixed to housing 12 by suction cup arm 20.

Figure 4:
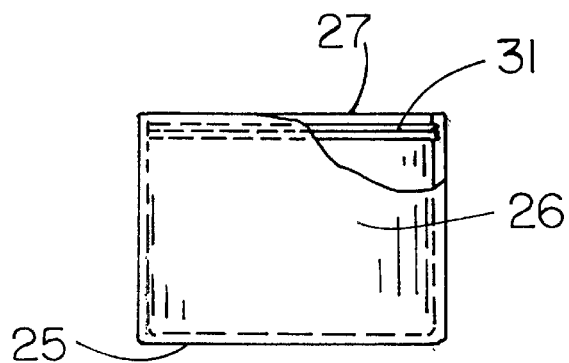
FIG. 4 is a side view of a cap.

FIG. 4 shows cap 26 having cap top 27 and cap bottom 25. Cap top 27 is threaded 31 for rotatably engagement with housing second end 35.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An apparatus for monitoring a liquid level in a container comprising:

a housing having a first end and a second end;

an alarm fixedly engaged within said housing and electrically connected to a third contact and to a second contact;

a power supply comprising the third contact, a fourth contact, and a battery removably and electrically engaged to said third contact and to said fourth contact;

a speaker fixedly engaged to said housing and electrically connected to said alarm;

a float slidingly engaged in said housing;

a contact arm fixedly engaged to said float;

a first contact fixedly engaged to said contact arm;

an attachment device affixed to said housing, said attachment device operable for maintaining said apparatus in a fixed position relative to said container;

the second end having a threaded portion for engagement of a cap;

wherein said cap is threaded for rotatable engagement with said housing;

wherein said cap, when fully engaged with said housing, restricts the sliding engagement of said float within said housing;

wherein the apparatus contains exactly one first contact and one second contact; and wherein when said second contact comes in contact with said first contact, said speaker emits an audible signal.

2. The apparatus of claim 1 further comprising a lip fixedly engaged to said housing second end, wherein said lip prevents said float from disengaging said housing.

3. The apparatus of claim 1 further comprising:

a first groove;

a second groove;

a first arm; and a second arm;

wherein, said first arm is slidingly engaged in said first groove and said second arm is slidingly engaged in said second groove.

4. The apparatus of claim 1 further comprising a battery compartment having a lid.

5. The third contact of claim 1 wherein current will flow from said battery to said alarm when the first contact engages the second contact.

6. The apparatus of claim 1 further comprising an alarm compartment.

7. The apparatus of claim 1 further comprising a contact compartment.

8. The apparatus of claim 1 wherein the attachment device is a suction cup.

9. An apparatus for monitoring a liquid level in a container comprising:

a housing, cylindrical in shape and having a first end and a second end;

a power supply comprising a third contact, a fourth contact, and a battery removably and electrically engaged to said third contact and to said fourth contact;

an alarm fixedly engaged within said housing and electrically connected to the third contact and to a second contact;

a speaker fixedly engaged to said housing and electrically connected to said alarm;

a float, cylindrical in shape and disposed for coaxial sliding engagement with said housing;

a contact arm fixedly engaged to said float;

a first contact fixedly engaged to said contact arm;

a suction cup fixedly engaged to said housing;

the second end having a threaded portion for engagement of a cap;

wherein said cap is threaded for rotatable engagement with said housing;

wherein said cap, when fully engaged with said housing, restricts the sliding engagement of said float within said housing;

wherein the apparatus contains exactly one first contact and one second contact; and wherein when said second contact comes in contact with said first contact, said speaker emits an audible signal.

10. The apparatus of claim 9 further comprising a lip fixedly engaged to said housing second end, wherein said lip prevents said float from disengaging said housing.

11. The apparatus of claim 9 further comprising:

a first groove;

a second groove;

a first arm;

a second arm; and wherein, said first arm is slidingly engaged in said first groove and said second arm is slidingly engaged in said second groove.

12. The apparatus of claim 9 further comprising a battery compartment having a lid.

13. The apparatus of claim 9 wherein current will flow from said battery to said alarm when the first contact engages the second contact.

14. An apparatus for monitoring a liquid level in a container comprising:

a housing having a first end and a second end;

an alarm fixedly engaged within said housing and electrically connected to a third contact and to a second contact;

a power supply comprising the third contact, a fourth contact, and a battery removably and electrically engaged to said third contact and to said fourth contact;

a speaker fixedly engaged to said housing and electrically connected to said alarm;

a float slidingly engaged in said housing;

a contact arm fixedly engaged to said float;

a first contact fixedly engaged to said contact arm;

a suction cup fixedly engaged to said housing;

a cap, threaded for rotatable engagement with said second end of said housing;

wherein the apparatus contains exactly one first contact and one second contact;

wherein when said second contact comes in contact with said first contact, said speaker emits an audible signal; and wherein said cap, when fully engaged with said housing, restricts the sliding engagement of said float within said housing.

15. The apparatus of claim 14 further comprising a lip fixedly engaged to said housing second end, wherein said lip prevents said float from disengaging said housing.

16. The apparatus of claim 14 further comprising:

a first groove;

a second groove;

a first arm;

a second arm; and wherein, said first arm is slidingly engaged in said first groove and said second arm is slidingly engaged in said second grooves.

17. The apparatus of claim 14 further comprising a battery compartment having a lid.

18. The apparatus of claim 14 wherein current will flow from said battery to said alarm when the first contact engages the second contact.

* * * * *